(12) United States Patent
Ma

(10) Patent No.: US 8,760,828 B2
(45) Date of Patent: Jun. 24, 2014

(54) ELECTRO-STATIC DISCHARGE CLAMP (ESD) FOR NXVDD POWER RAIL

(75) Inventor: Wei Yu Ma, Taitung (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 156 days.

(21) Appl. No.: 13/415,621

(22) Filed: Mar. 8, 2012

(65) Prior Publication Data

US 2013/0235497 A1 Sep. 12, 2013

(51) Int. Cl.
*H02H 3/22* (2006.01)

(52) U.S. Cl.
USPC ............................. 361/56; 361/91.1; 361/111

(58) Field of Classification Search
USPC ........................................... 361/56, 91.1, 111
See application file for complete search history.

(56) References Cited

U.S. PATENT DOCUMENTS

| | | | | |
|---|---|---|---|---|
| 7,102,862 | B1 * | 9/2006 | Lien et al. | 361/56 |
| 7,203,045 | B2 * | 4/2007 | Chatty et al. | 361/91.1 |
| 7,221,551 | B2 * | 5/2007 | Chen | 361/230 |
| 7,408,752 | B2 * | 8/2008 | Ma et al. | 361/56 |
| 8,363,368 | B2 * | 1/2013 | Poulton | 361/56 |
| 2005/0040466 | A1 * | 2/2005 | Arai et al. | 257/362 |

* cited by examiner

Primary Examiner — Rexford Barnie
Assistant Examiner — Zeev V Kitov
(74) Attorney, Agent, or Firm — Duane Morris LLP

(57) ABSTRACT

A circuit with an electro-static discharge clamp coupled to a first power source and second power source. The electro-static discharge clamp includes an NMOS stack and an electro-static discharge detector. The NMOS stack has a first NMOS transistor with gate node ng1 and a second NMOS transistor with gate node ng2. The electro-static discharge detector is configured to control the NMOS stack, and may include three switches. A first switch is configured to switch the gate node ng1 to the second power source. A second switch is configured to switch the gate node ng1 to the gate node ng2. A third switch is configured to switch the gate node ng1 to the ground.

16 Claims, 9 Drawing Sheets

ELECTRO-STATIC DISCHARGE CLAMP (ESD) FOR NXVDD POWER RAIL

BACKGROUND

1. Technical Field

Aspects of the present disclosure relate in general to electronic circuitry. In particular, aspects of the disclosure include an electro-static discharge (ESD) clamp designed to be used with a high-power VDD rail in a single gate complementary metal oxide semiconductor (CMOS) circuit.

2. Description of the Related Art

Connections to integrated circuit (IC) inputs, outputs, and power are susceptible to electro-static discharge events that can damage internal components. An ESD event is a short discharge of electric energy caused by the sudden release of an electro-static build-up of electrical charge. If electro-static discharge-induced currents flow suddenly and strongly through electronic components, the high currents can literally melt the carefully formed layers of an integrated circuit. A chip is particularly susceptible to electro-static discharge when it is not mounted into a larger circuit (e.g., mounted onto a printed circuit board). Electro-static discharge protection is therefore particularly important in maintaining the reliability of semiconductor products, and commercial integrated circuits are generally expected to sustain without damage an electro-static discharge event in excess of 2,000 volts, which is often denoted as the human-body-model ESD voltage.

Semiconductor devices are becoming increasingly complex, and at the same time the devices' circuitry is becoming smaller and more crowded on the devices to accommodate the new and complex functions. The decreased size and spacing of the Reliability in semiconductor circuits is an important aspect of chip design. With the increasing complexity of CMOS circuits and the increased density of the silicon on which the circuits reside, the power-supply voltage for such circuits are reduced for low-power applications. At the same time, the thickness of gate oxide is often scaled down to increase circuit operating speed. However, this scaling increases the number of semiconductor processing steps.

Another issue with thinner gate-oxides is that the gate-oxide may become overstressed.

In a conventional power supply clamp circuit 1000 is shown in FIG. 1. The circuit 1000 may include a high-performance IC 110 or high-voltage circuit 120, and an active ESD clamp 100. ESD clamp 100 works during ESD events to provide a current path from the input pad 130A-B or power supply VDD to the substrate bias voltage supply, VSS, which is normally ground, or to another circuit element that is equipped to absorb the ESD current. In a conventional power supply clamp circuit, the power supply line is routed to ground through a clamp transistors that is biased to be "off" during normal circuit operation. When a voltage in excess of the maximum allowed voltage on a power supply line is detected by the ESD protection circuit, the clamp transistor will turn "on," thereby shunting the induced ESD potential to ground.

SUMMARY

Embodiments include a circuit with an electro-static discharge clamp coupled to a first power source and second power source. The electro-static discharge clamp includes an NMOS stack and an electro-static discharge detector. The NMOS stack has a first NMOS transistor with gate node ng1 and a second NMOS transistor with gate node ng2. The electro-static discharge detector is configured to control the NMOS stack, and may include three switches. A first switch is configured to switch the gate node ng1 to the second power source. A second switch is configured to switch the gate node ng1 to the gate node ng2. A third switch is configured to switch the gate node ng1 to the ground. During normal operation of the circuit, the first switch is open, the second switch is open, and the third switch is closed. During an electronic discharge event, the first switch is closed, the second switch is closed, and the third switch is open. An electro-static discharge sensor may be configured to control the second switch and the third switch. In some embodiments, the electro-static discharge sensor may be a resistance-capacitance (RC) inverter, or a latch circuit detector. In some embodiments, the first switch may be a capacitor or a diode string. In yet other embodiments, the second switch may be a PMOS transistor. In another embodiment, the third switch may be a third NMOS transistor.

Embodiments also include a method of operating an electro-static discharge clamp coupled to a first power source and second power source during an electronic discharge event. The method includes shorting a first switch configured to switch a gate node ng1 of a first NMOS transistor to the second power source shorting a second switch configured to switch the gate node ng1 to the gate node ng2 of a second NMOS transistor, and opening a third switch configured to switch the gate node ng2 to the ground. The first NMOS transistor has a drain connected to the second power source. The second NMOS transistor being stacked with the first NMOS transistor and having a source connected to ground.

DETAILED DESCRIPTION

Figure 1:
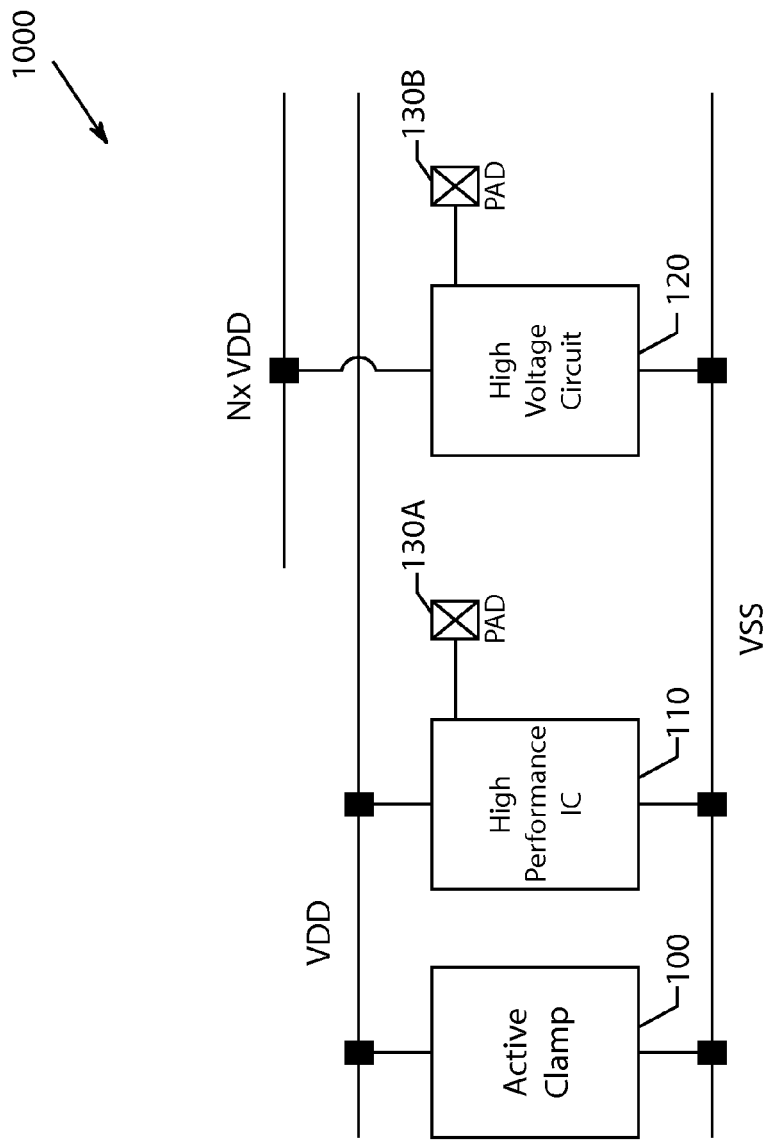
FIG. 1 depicts a conventional circuit structure using an active electro-static discharge clamp of the PRIOR ART.

One aspect of the present disclosure includes an electro-static discharge clamp designed to be used with a high-power VDD rail in a single gate complementary metal oxide semiconductor circuit.

In another aspect, an n-channel metal oxide semiconductor (NMOS) transistor stack is used to discharge an ESD current. A detector is used to control the NMOS gate oxide stack. Electro-static discharge detection may be performed in a variety of different ways without deviating from the spirit of the disclosure.

Embodiments overcome the gate oxide reliability issue. This results in a more reliable circuit.

The following embodiments are described in a plurality of sections. Further, circuit elements making up each of functional blocks of the following embodiments are formed on a semiconductor substrate made of a single crystal silicon by use of the known integrated circuit (integrated circuit) technology for complementary metal oxide semiconductors transistors. With the present embodiments, a MOSFET (Metal Oxide Semiconductor Field Effect Transistor) (abbreviated to MOS transistor) is used as an example of a Metal Insulator Semiconductor Field Effect Transistor (MISFET). However, a non-oxide film is not precluded as a gate insulating film. In the drawings, a symbol O is affixed to a p-channel MOS transistor (PMOS transistor or "p-type" transistor) to be thereby differentiated from an n-channel MOS transistor (NMOS transistor or "n-type" transistor). Further, in the drawings, connection of a substrate potential of a MOS transistor is not specifically shown, however, there is no particular limitation to a connection method thereof if the MOS transistor is present in a normally operable range.

Embodiments of the invention will be described hereinafter with reference to the drawings. In all the drawings for use describing the embodiments, identical members are in principle denoted by like reference numerals, thereby omitting detailed description thereof.

Figure 2:
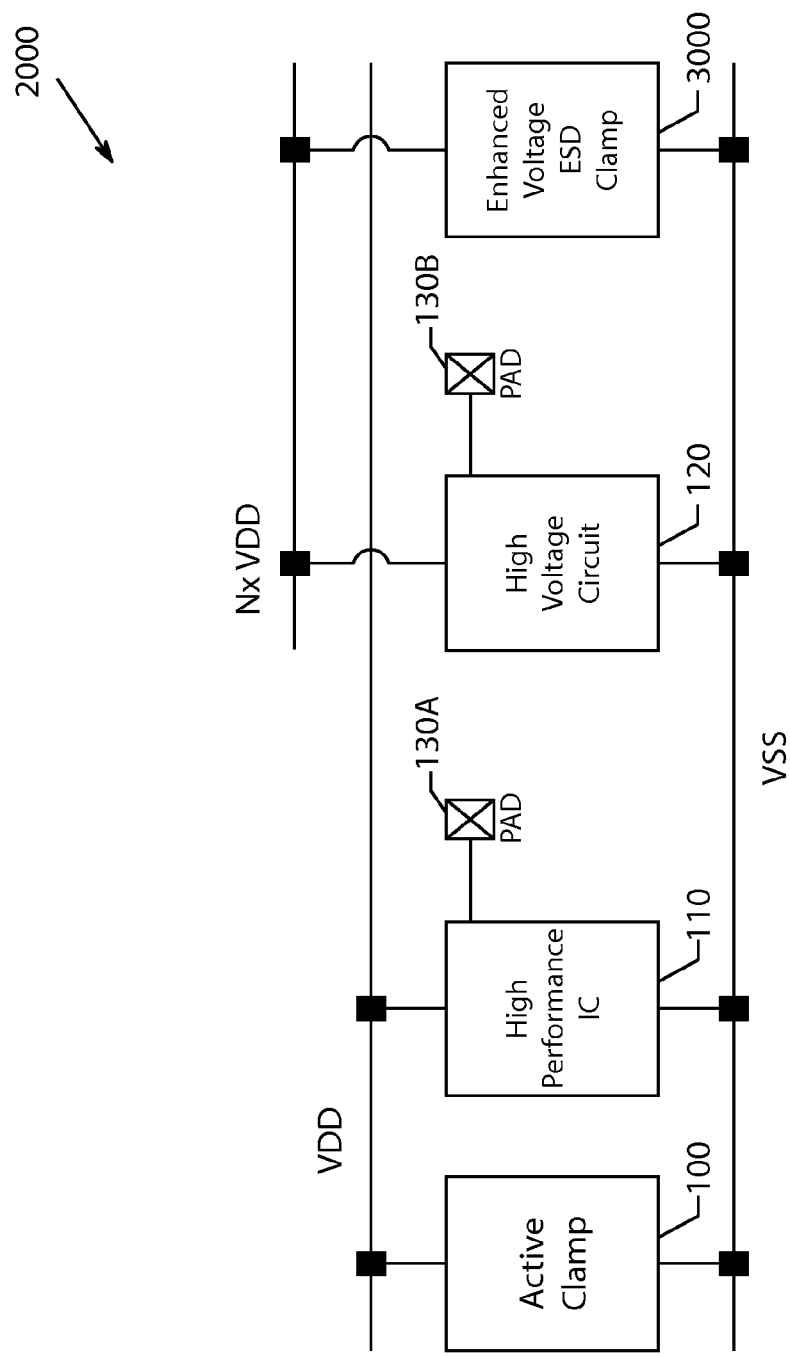
FIG. 2 illustrates a circuit using an embodiment of electro-static discharge clamp for use with a high-power VDD rail in a single gate complementary metal oxide semiconductor circuit.

Turning, to an embodiment of a circuit 2000 with an high voltage electro-static discharge clamp 3000, shown in FIG. 2. FIG. 2 illustrates an embodiment of a electro-static discharge clamp 3000, constructed and operative in accordance with an embodiment of the current disclosure. As shown in FIG. 2, circuit 2000 may comprise an enhanced (or high) voltage ESD clamp 3000 for use with a high voltage circuit 120, a high performance integrated circuit 110. High performance integrated circuit 110 and high voltage circuit 120 may each be connected to a contact pad 130A-B. In addition, an active clamp 100 may also be used.

Figure 3:
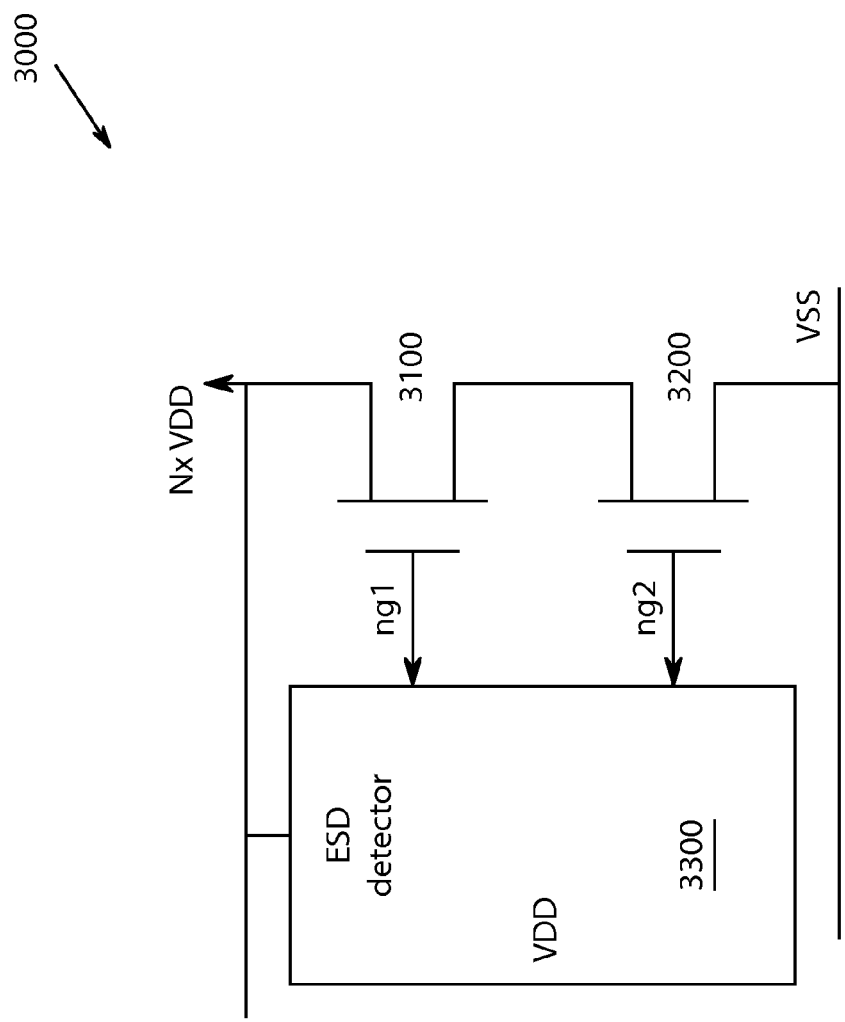
FIG. 3 is an embodiment of an electro-static discharge clamp for use with a high-power VDD rail.

Moving to FIG. 3, electro-static discharge clamp 3000 for use with a high-power (N×VDD) rail is illustrated, constructed and operative in accordance with an embodiment of the current disclosure. As shown, electro-static discharge clamp 3000 comprises two stacked NMOS transistors 3100, 3200 with gates ng1 and ng2 each coupled to an electro-static discharge detector circuit 3300. The drain of NMOS transistor 3100 is connected to the high power (second) power source, while the source of NMOS transistor 3200 is connected to ground. ESD detector 3300 controls the NMOS transistor stack 3100, 3200 without a gate oxide reliability issue. Embodiments and depicting details and operation of ESD detector 3300 are described below.

Figure 4A:
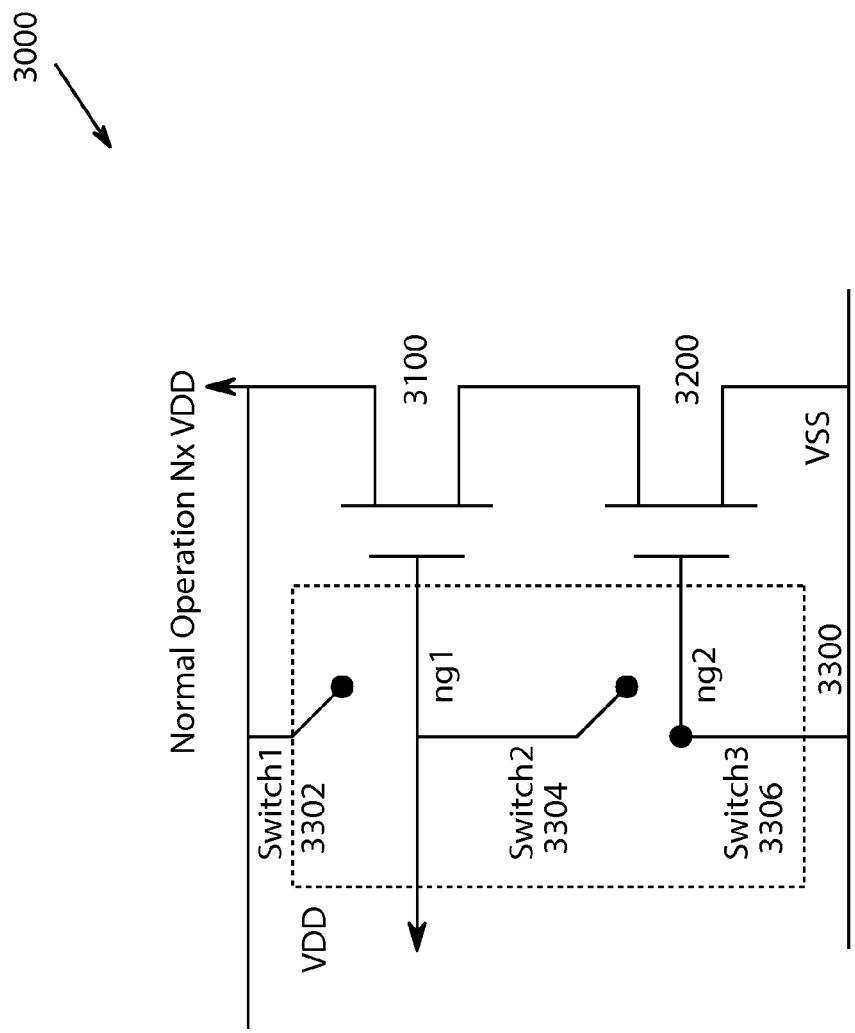
FIGS. 4A and 4B depict an embodiment of an electro-static discharge clamp for use with a high-power VDD rail in normal operation and during an electro-static discharge event.
Figure 4B:
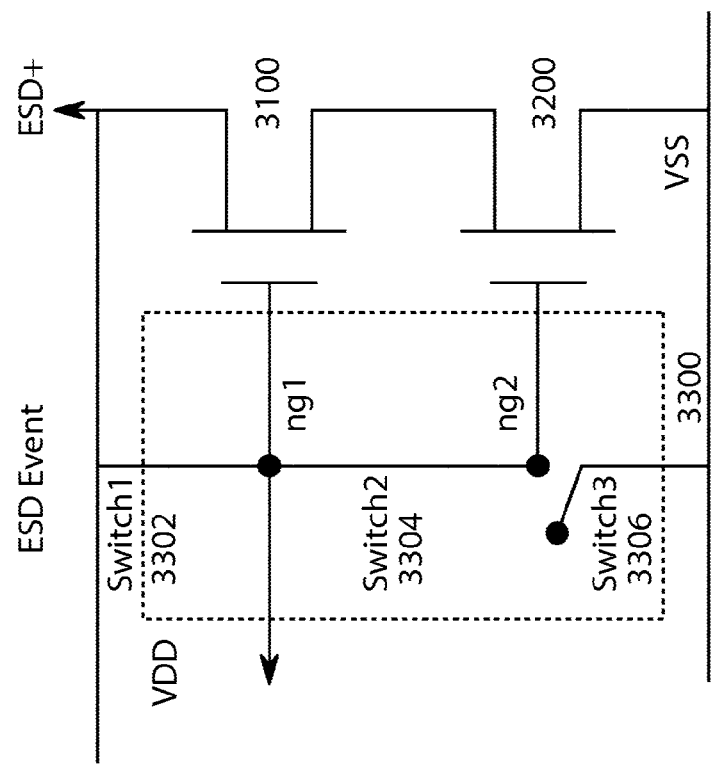

FIGS. 4A and 4B depict an embodiment of an electro-static discharge clamp for use with a high-power VDD rail in normal operation and during an electro-static discharge event, constructed and operative in accordance with an embodiment of the current disclosure. FIG. 4A shows a normal operation of electro-static discharge clamp 3000, while FIG. 4B illustrates an electro-static discharge operation of the ESD clamp 3000. As shown in both figures FIG. 4A and FIG. 4B, electro-static discharge detector circuit 3300 comprises switch 1 3302, switch 2 3304, and switch 3 3306. The three switches 3302-3306 may be implemented in any way known in the art.

Switch 1 3302 may couple node ng1 with N×VDD; switch 2 3304 may couple node ng1 with node ng2, while switch 3 3306 may couple node ng2 with VSS (ground).

In normal operation, shown in FIG. 4A, switch 1 3302 is open, which ties node ng1 with VDD. Meanwhile node ng2 is connected to VSS (ground), and switch 2 3304 is open, and switch 3 3306 connects node ng2 to ground.

When an electro-static discharge event occurs, shown in FIG. 4B, switch 1 3302 connects node ng1 to ESD+. Meanwhile node ng2 connected to ESD+, and switch 2 3304 connects node 2 to ng1 to ESD+, and switch 3 3306 connects node ng2 is open.

In these embodiments, switch 1 may be implemented as a capacitance or diode string. Switch 2 may be a PMOS transistor, and switch 3 may be an NMOS transistor. In such embodiments, switch 2 and switch 3 may be controlled using a resistance-capacitance (RC) inverter, or a latch circuit. Embodiments will be shown both in normal operation and during an electro-static discharge event.

Figures 5A, 5B:
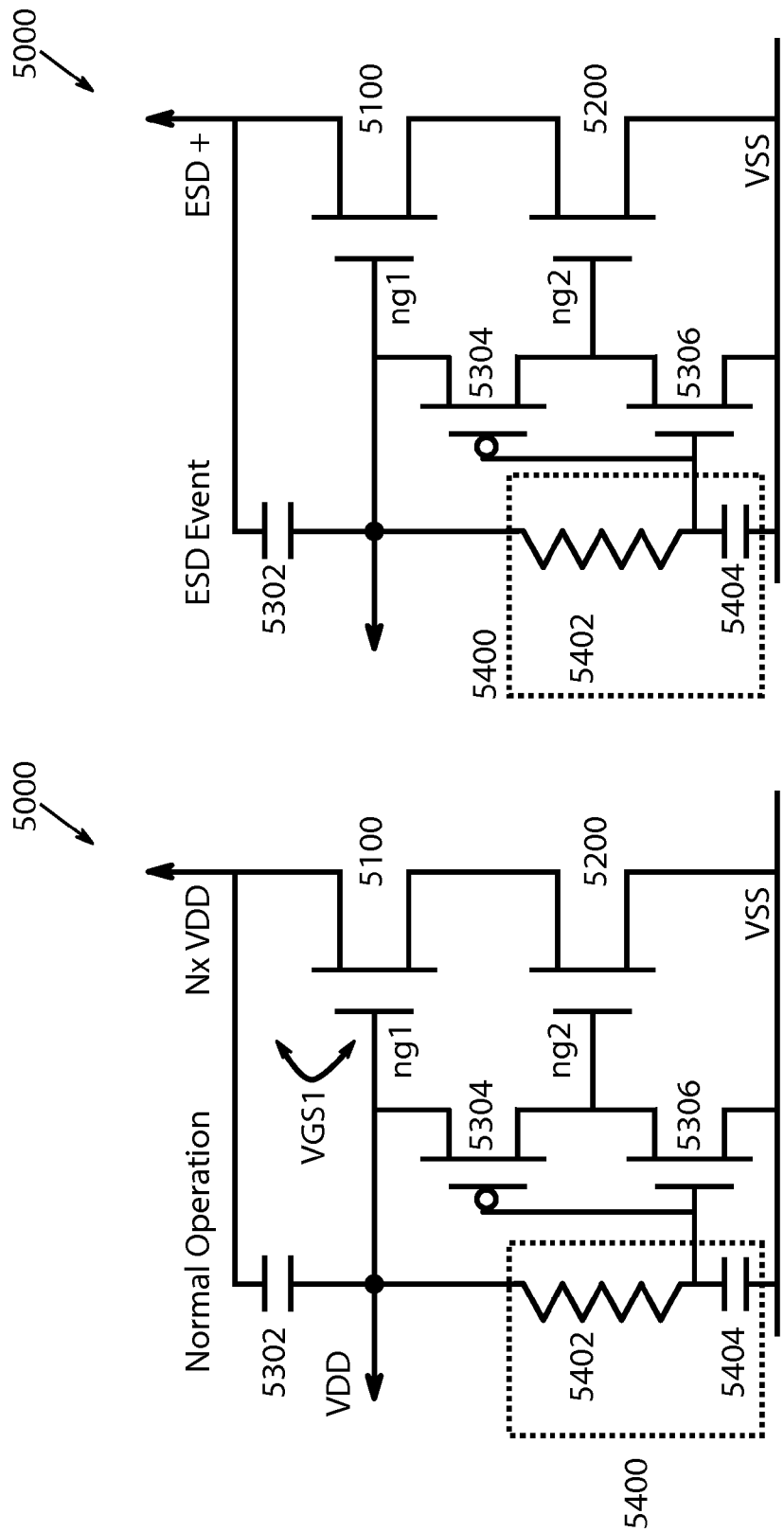
FIGS. 5A and 5B illustrate an alternate embodiment of an electro-static discharge clamp with a capacitance and a resistor-capacitor (RC)-based detector to detect electro-static discharge in normal operation and during an electro-static discharge event.

FIGS. 5A and 5B illustrate an alternate embodiment of an electro-static discharge clamp with a capacitance and a resistor-capacitor (RC)-based detector to detect electro-static discharge in normal operation and during an electro-static discharge event, constructed and operative in accordance with an embodiment of the current disclosure.

FIG. 5A depicts an embodiment in which electro-static discharge clamp 5000 comprises two stacked NMOS transistors 5100, 5200 with gates at nodes ng1 and ng2 each coupled to an electro-static discharge detector circuit with three switches. In this embodiment, switch 1 5302 is a capacitance, switch 2 5304 is a PMOS transistor, and switch 3 is another NMOS transistor 5306. The capacitor 5302 acts to sense an electro-static discharge signal for node ng1. Furthermore, switch 2 and switch 3 may be controlled using a resistance-capacitance (RC) 5400, comprising resistor 5402 and capacitor 5404.

During an electro-static discharge event, as shown in FIG. 5B, the capacitor (switch 1) 5302 couples node ng1 with ESD+. An electro-static discharge sensor 5400, in this example resistance-capacitance (RC) 5400, senses the electro-static discharge event and connects node ng2 with ESD+ (turning switch 2 5304 on), and switches switch 3 5306 off.

Figures 6A, 6B:
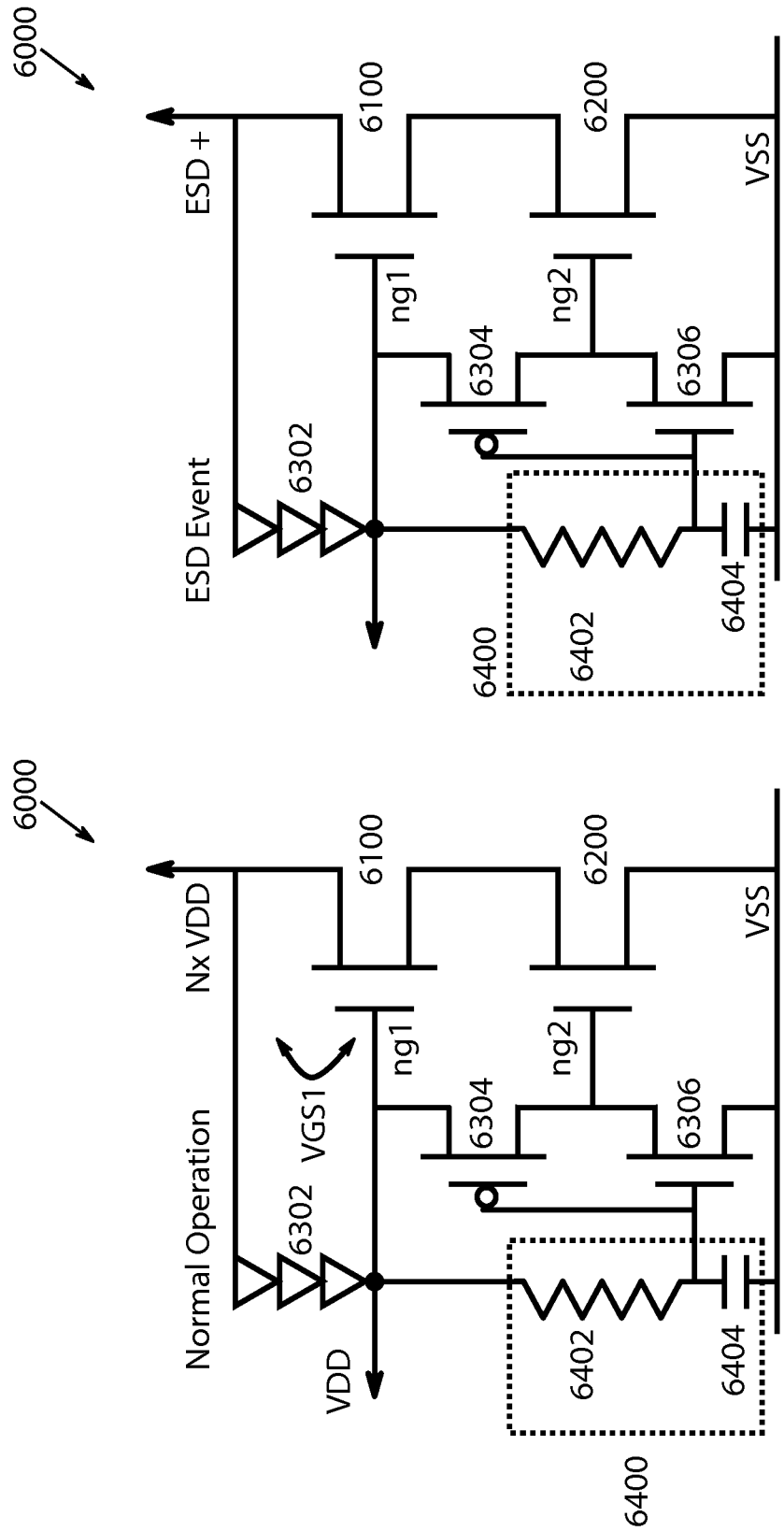
FIGS. 6A and 6B show another alternate embodiment of an electro-static discharge clamp with a diode string and a resistor-capacitor (RC)-based detector to detect electro-static discharge in normal operation and during an electro-static discharge event.

FIGS. 6A and 6B illustrate another alternate embodiment of an electro-static discharge clamp with a diode string and a resistor-capacitor (RC)-based detector to detect electro-static discharge in normal operation and during an electro-static discharge event, constructed and operative in accordance with an embodiment of the current disclosure.

As shown in FIG. 6A, an embodiment in which electro-static discharge clamp 6000 comprises two stacked NMOS transistors 6100, 6200 with gates at nodes ng1 and ng2 each coupled to an electro-static discharge detector circuit with three switches. In this embodiment, switch 1 6302 is a diode string 6302, switch 2 is 6304 is a PMOS transistor, and switch 3 is another NMOS transistor 6306. The diode string 6302 acts to sense an electro-static discharge signal for node ng1. Furthermore, switch 2 and switch 3 may be controlled using a resistance-capacitance (RC) inverter 6400, comprising resistor 6402 and capacitor 6404.

During an electro-static discharge event, as illustrated in FIG. 6B, the diode string (switch 1) 6302 connects node ng1 with ESD+. An electro-static discharge sensor 6400, in this example a resistance-capacitance (RC) inverter 6400, senses the electro-static discharge event and couples node ng2 with ESD+ (turning switch 2 6304 on), and switches switch 3 6306 off.

Figures 7A, 7B:
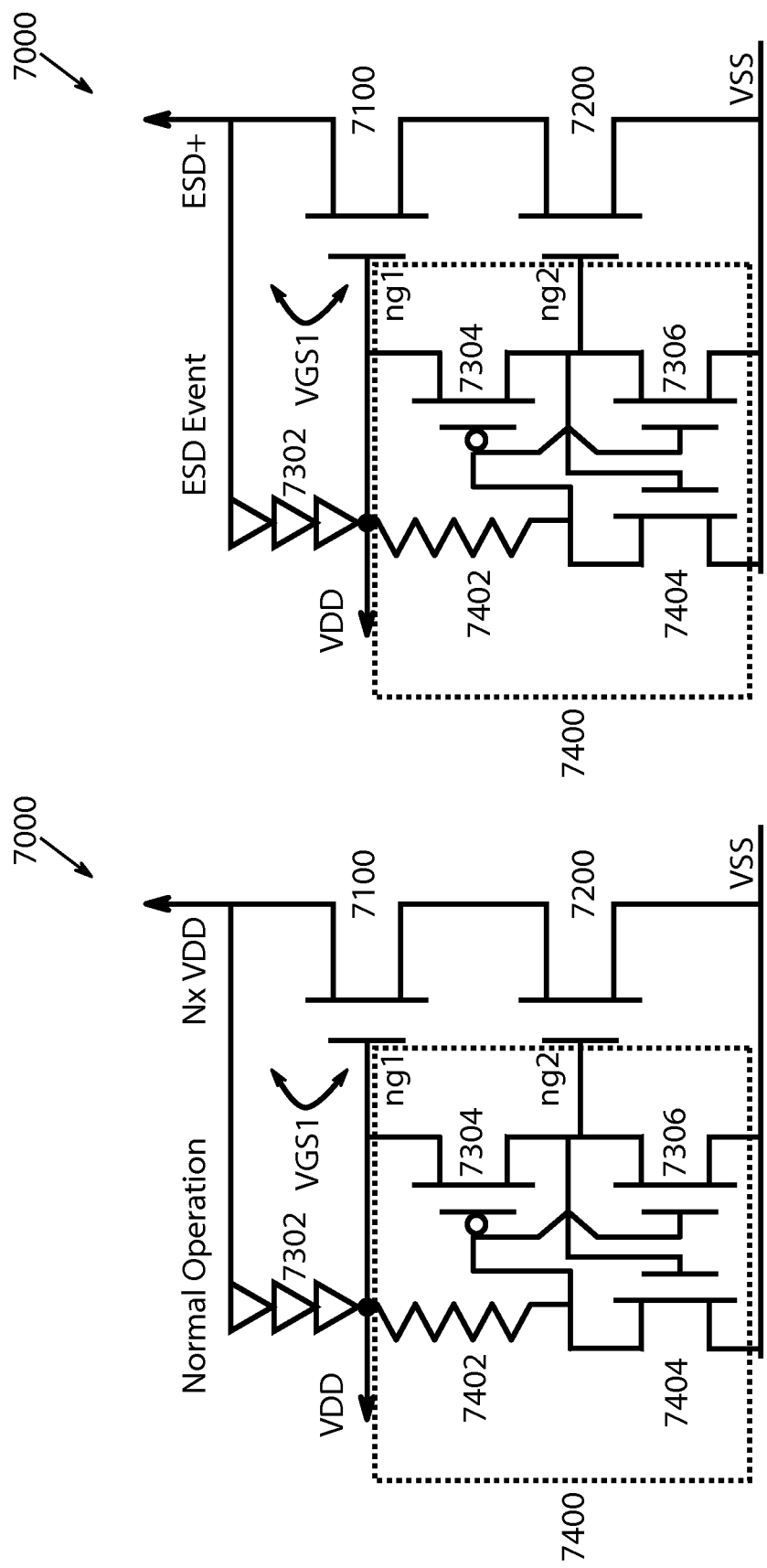
FIGS. 7A and 7B illustrate an alternate embodiment of electro-static discharge clamp with a diode string and a latch circuit detector to detect electro-static discharge in normal operation and during an electro-static discharge event.

FIGS. 7A and 7B illustrate an alternate embodiment of electro-static discharge clamp with a diode string and a latch circuit detector to detect electro-static discharge in normal operation and during an electro-static discharge event, constructed and operative in accordance with an embodiment of the current disclosure.

FIG. 7A depicts an embodiment in which electro-static discharge clamp 7000 comprises two stacked NMOS transistors 7100, 7200 with gates at nodes ng1 and ng2 each coupled to an electro-static discharge detector circuit with three switches. In this embodiment, switch 1 7302 is a diode string 7302, switch 2 is 7304 is a PMOS transistor, and switch 3 is another NMOS transistor 7306. The capacitor 7302 acts to sense an electro-static discharge signal for node ng1. Furthermore, switch 2 and switch 3 may be controlled using an electro-static discharge sensor 7400, in this figure a latch circuit detector 7400, comprising resistor 7402 and an NMOS transistor 7404.

When an electro-static discharge event occurs, as shown in FIG. 7B, the diode string (switch 1) 7302 connects node ng1 with ESD+α. latch circuit detector 7400 senses the electro-static discharge event and couples node ng2 with ESD+ (turning switch 2 7304 on), and switches switch 3 7306 off.

Figures 8A, 8B:
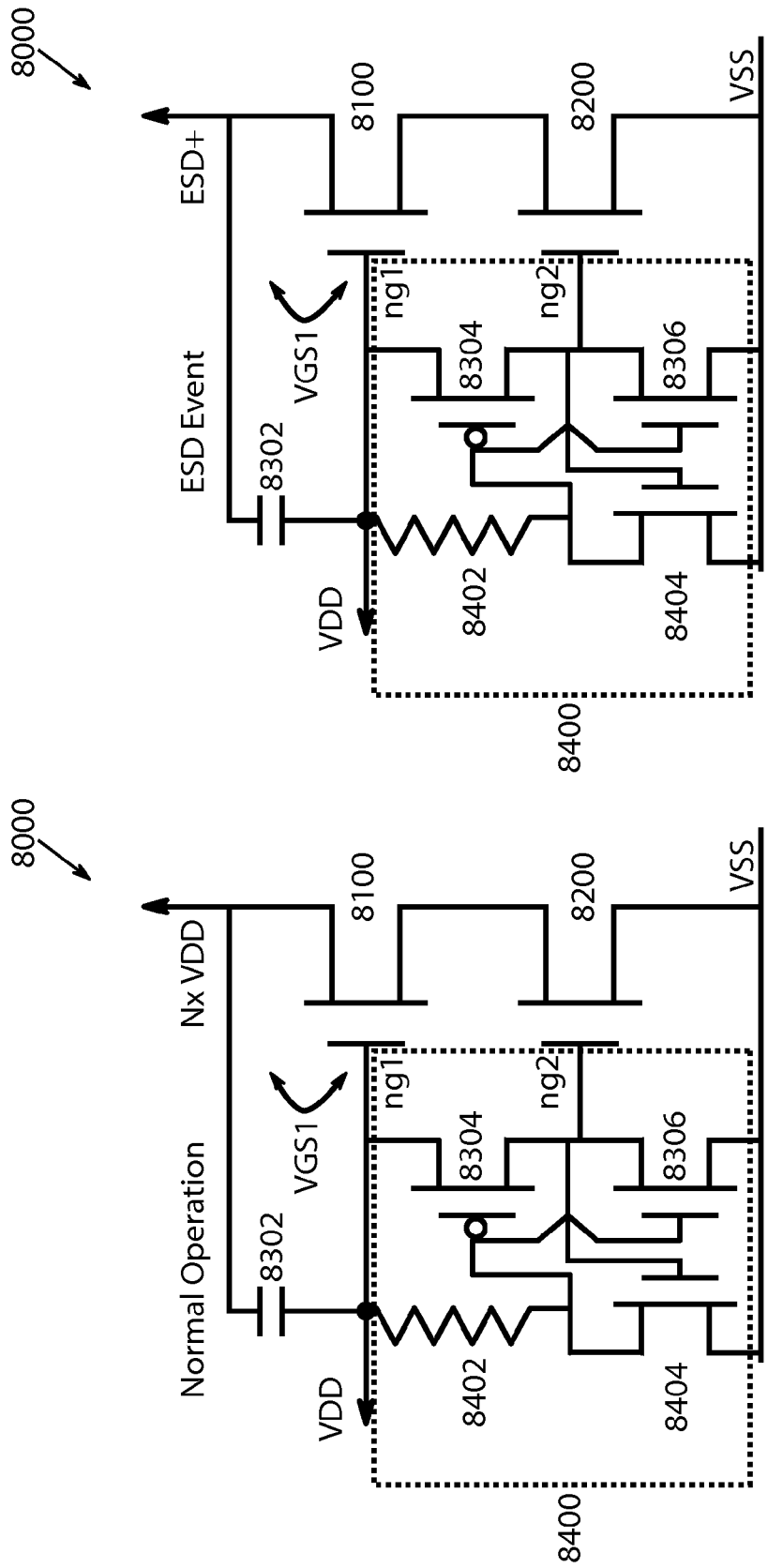
FIGS. 8A and 8B illustrate an alternate embodiment of electro-static discharge clamp with a capacitance and a latch circuit detector to detect electro-static discharge in normal operation and during an electro-static discharge event.

FIGS. 8A and 8B illustrate an alternate embodiment of electro-static discharge clamp with a capacitance and a latch circuit detector to detect electro-static discharge in normal operation and during an electro-static discharge event, constructed and operative in accordance with an embodiment of the current disclosure.

FIG. 8A depicts an embodiment in which electro-static discharge clamp 8000 comprises two stacked NMOS transistors 8100, 8200 with gates at nodes ng1 and ng2 each coupled to an electro-static discharge detector circuit with three switches. In this embodiment, switch 1 8302 is a capacitor 8302, switch 2 is 8304 is a PMOS transistor, and switch 3 is another NMOS transistor 8306. The capacitor 8302 acts to sense an electro-static discharge signal for node ng1. Furthermore, switch 2 and switch 3 may be controlled using an electro-static discharge sensor 8400, in this example a latch circuit detector 8400, comprising resistor 8402 and an NMOS transistor 8404.

When an electro-static discharge event occurs, as shown in FIG. 8B, the capacitor (switch 1) 8302 couples node ng1 with ESD+. latch circuit detector 8400 senses the electro-static discharge event and couples node ng2 with ESD+ (turning switch 2 8304 on), and switches switch 3 8306 off.

The previous description of the embodiments is provided to enable any person skilled in the art to practice the invention. The various modifications to these embodiments will be readily apparent to those skilled in the art, and the generic principles defined herein may be applied to other embodiments without the use of inventive faculty. Thus, the current disclosure is not intended to be limited to the embodiments shown herein, but is to be accorded the widest scope consistent with the principles and novel features disclosed herein.

What is claimed is:

1. A circuit with an electro-static discharge clamp coupled to a first power source and second power source, comprising:
    an NMOS transistor stack comprising:
        a first NMOS transistor with gate node ng1 and a drain connected to the first power source;
        a second NMOS transistor with gate node ng2, the second NMOS transistor being stacked with the first NMOS transistor and a source connected to ground; and
        an electro-static discharge detector configured to control the NMOS transistor stack, wherein the electro-static discharge detector further comprising:
    a first switch configured to switch the gate node ng1 to the first power source;
    a second switch configured to switch the gate node ng1 to the gate node ng2;
    a third switch configured to switch the gate node ng2 to the ground; and
    an electro-static discharge sensor coupled to and configured to control the second switch and the third switch but not the first switch.

2. The circuit of claim 1, wherein the voltage of the first power source is greater than the voltage of the second power source.

3. The circuit of claim 1, wherein during a normal operation,
    the first switch is open;
    the second switch is open; and
    the third switch is short.

4. The circuit of claim 3, wherein during an electronic discharge event,
    the first switch is short;
    the second switch is short; and
    the third switch is open.

5. The circuit of claim 1, wherein the electro-static discharge sensor is a resistance-capacitance (RC).

6. The circuit of claim 1, wherein the second switch is a PMOS transistor.

7. The circuit of claim 6, wherein the third switch is a third NMOS transistor.

8. The circuit of claim 7, the wherein the first switch is a capacitor.

9. The circuit of claim 7, the wherein the first switch is a diode string.

10. The circuit of claim 6, wherein the electro-static discharge sensor is a latch circuit detector.

11. The circuit of claim 10, wherein the second switch is a PMOS transistor.

12. The circuit of claim 11, wherein the third switch is a third NMOS transistor.

13. The circuit of claim 5, the wherein the capacitor is an NMOS, PMOS MIM (Metal-Insulator-Metal) or MOM (Metal Oxide Metal) capacitor.

14. The circuit of claim 8, the wherein the capacitor is an NMOS, PMOS MIM (Metal-Insulator-Metal) or MOM (Metal Oxide Metal) capacitor.

15. A circuit with an electro-static discharge clamp coupled to a first power source and second power source, comprising:
    an NMOS transistor stack comprising:
        a first NMOS transistor with gate node ng1 and a drain connected to the second power source;
        a second NMOS transistor with gate node ng2, the second NMOS transistor being stacked with the first NMOS transistor and a source connected to ground; and
        an electro-static discharge detector configured to control the NMOS transistor stack;
    a first switch configured to switch the gate node ng1 to the second power source;
    a second switch configured to switch the gate node ng1 to the gate node ng2;
    a third switch configured to switch the gate node ng2 to the ground; and
    an electro-static discharge sensor coupled to and configured to control the second switch and the third switch but not the first switch, wherein the electro-static discharge sensor is a resistance-capacitance (RC);
    wherein the voltage of the second power source is greater than the voltage of the first power source.

16. A method of operating an electro-static discharge clamp coupled to a first power source and second power source during an electronic discharge event, comprising:

shorting a first switch configured to switch a gate node ng1 of a first NMOS transistor to the second power source, the first NMOS transistor having a drain connected to the second power source;

shorting a second switch configured to switch the gate node ng1 to the gate node ng2 of a second NMOS transistor, the second NMOS transistor being stacked with the first NMOS transistor and having a source connected to ground;

opening a third switch configured to switch the gate node ng2 to the ground; and coupling to and controlling the second switch and the third switch but not the first switch via an electro-static discharge sensor, wherein the electro-static discharge sensor is a resistance-capacitance (RC).

* * * * *

UNITED STATES PATENT AND TRADEMARK OFFICE
CERTIFICATE OF CORRECTION

PATENT NO.        : 8,760,828 B2
APPLICATION NO.   : 13/415621
DATED             : June 24, 2014
INVENTOR(S)       : Wei Yu Ma It is certified that error appears in the above-identified patent and that said Letters Patent is hereby corrected as shown below:

In the Claims:

Claim 8, Column 6, Line 30 – delete "the wherein" and insert -- wherein --.

Claim 9, Column 6, Line 32 – delete "the wherein" and insert -- wherein --.

Claim 13, Column 6, Line 40 – delete "the wherein" and insert -- wherein --.

Claim 14, Column 6, Line 43 – delete "the wherein" and insert -- wherein --.

Signed and Sealed this
Tenth Day of March, 2015

Michelle K. Lee
*Deputy Director of the United States Patent and Trademark Office*